(12) United States Patent
Fortin et al.

(10) Patent No.: US 8,523,251 B1
(45) Date of Patent: Sep. 3, 2013

(54) BUMPER FASCIA SUPPORT ASSEMBLY

(75) Inventors: Hugo F. Fortin, Commerce Township, MI (US); Matthew Huber, Livonia, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 13/492,494

(22) Filed: Jun. 8, 2012

(51) Int. Cl.
*B60R 19/26* (2006.01)

(52) U.S. Cl.
USPC .......................................... 293/132

(58) Field of Classification Search
USPC ............... 293/132, 102, 109, 115, 117, 120, 293/121, 133, 136, 155, 122; 248/48.2; 296/193.08, 203.02, 187.09, 193.09
See application file for complete search history.

(56) References Cited

U.S. PATENT DOCUMENTS

| | | | | | |
|---|---|---|---|---|---|
| 3,933,387 | A | * | 1/1976 | Salloum et al. | 293/120 |
| 4,875,728 | A | * | 10/1989 | Copp et al. | 293/126 |
| 4,995,660 | A | * | 2/1991 | Horansky et al. | 293/132 |
| 5,080,411 | A | * | 1/1992 | Stewart et al. | 293/122 |
| 5,080,412 | A | * | 1/1992 | Stewart et al. | 293/155 |
| 5,727,827 | A | * | 3/1998 | Shibuya et al. | 293/155 |
| 6,003,912 | A | * | 12/1999 | Schonhoff et al. | 293/122 |
| 6,435,579 | B1 | * | 8/2002 | Glance | 293/155 |
| 6,736,434 | B2 | * | 5/2004 | Anderson et al. | 293/102 |
| 6,926,321 | B2 | * | 8/2005 | Zipfel | 293/102 |
| 7,255,377 | B2 | * | 8/2007 | Ahn | 293/102 |
| 7,823,959 | B2 | | 11/2010 | Wallman et al. | |
| 8,123,265 | B2 | * | 2/2012 | Nilsson | 293/155 |
| 2011/0204680 | A1 | * | 8/2011 | Fortin | 296/193.1 |
| 2013/0020822 | A1 | * | 1/2013 | Inoue et al. | 296/1.08 |
| 2013/0049384 | A1 | * | 2/2013 | Kekich et al. | 293/115 |

FOREIGN PATENT DOCUMENTS

| | | |
|---|---|---|
| DE | 10253270 A | 6/2004 |
| EP | 1992525 A | 11/2008 |
| JP | 02-299949 A | 12/1990 |
| JP | 04-100751 A | 4/1992 |
| JP | 06-316244 A | 11/1994 |
| JP | 2007-001347 A | 1/2007 |
| WO | WO-2007-148217 A | 12/2007 |

* cited by examiner

*Primary Examiner* — Kiran B Patel
(74) *Attorney, Agent, or Firm* — Global IP Counselors, LLP

(57) ABSTRACT

A bumper fascia support assembly includes a front support, a bracket and a bumper fascia. The bracket has a support attachment end, a body section and a fascia attachment end. The support attachment end is fixedly attached to a forward facing surface of the front support. The bumper fascia has a central section fixedly attached to the fascia attachment end of the bracket. The body section of the bracket has a controlled deflection structure that is configured with respect to the support attachment end and the fascia attachment end to deform downwardly in response to a prescribed impacting force being applied to the bumper fascia so that the fascia attachment end and the central section of the bumper fascia move downward relative to the support attachment end absorbing impact energy.

20 Claims, 9 Drawing Sheets

BUMPER FASCIA SUPPORT ASSEMBLY

BACKGROUND

1. Field of the Invention

The present invention generally relates to a bumper fascia support assembly. More specifically, the present invention relates to a bumper fascia support assembly that includes a bracket having a controlled deflection structure.

2. Background Information

Vehicle bumper structures are constantly undergoing redesign and reconfiguration to improve response to both high speed and low speed impact events. Certain structural elements of a vehicle bumper structure are designed to absorb forces associated with high speed impacts and other structures are designed to absorb forces associated with low speed impacts.

SUMMARY

One object is to provide a bumper fascia support assembly with a support member having a controlled deflection structure that responds to impact events by bending downward in a predetermined manner, where the impact events include a head-on impacting force applied to a bumper fascia that includes a downward impacting force component.

In view of the state of the known technology, one aspect of the present disclosure is to provide a bumper fascia support assembly with a front support, a bracket and a bumper fascia. The bracket has a support attachment end, a body section and a fascia attachment end, the support attachment end being fixedly attached to a forward facing surface of the front support. The bumper fascia has a central section fixedly attached to the fascia attachment end of the bracket. The body section of the bracket has a controlled deflection structure that is configured with respect to the support attachment end and the fascia attachment end to deform downwardly in response to a prescribed impacting force being applied to the bumper fascia so that the fascia attachment end and the central section of the bumper fascia move downward relative to the support attachment end absorbing impact energy.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
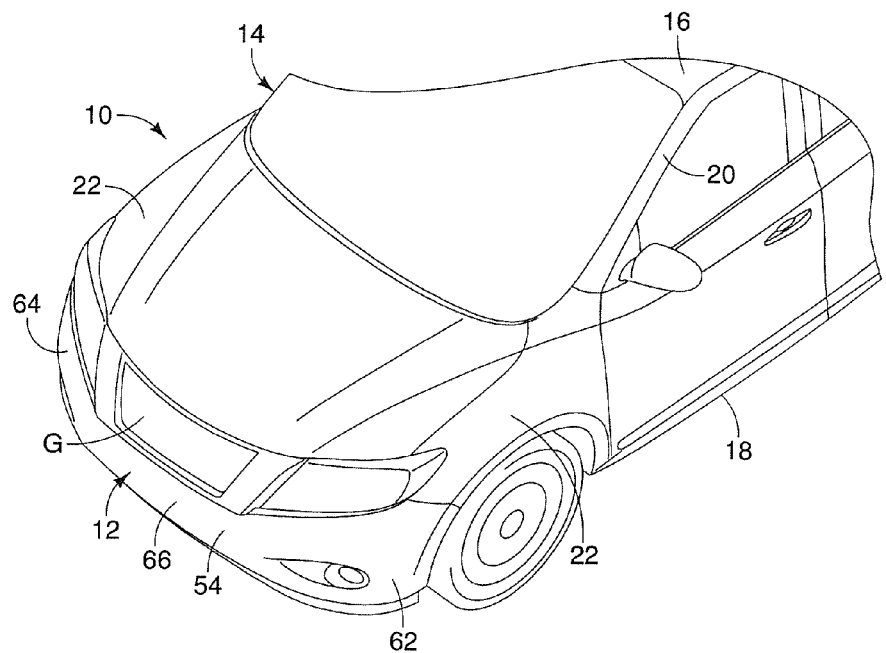
FIG. 1 is a perspective view of a vehicle showing portions of a bumper fascia assembly in accordance with one embodiment.

Referring initially to FIG. 1, a vehicle 10 having a bumper fascia support assembly 12 is illustrated in accordance with a first embodiment. The vehicle 10 includes, among other things, a vehicle body structure 14 that includes a roof 16, a sill 18, an A-pillar 20, front fenders 22, a radiator fan supporting assembly 24 (shown in FIG. 2) and the bumper fascia support assembly 12. The vehicle body structure 14, the roof 16, the sill 18, the A-pillar 20 and the front fenders 22 are all conventional features of the vehicle 10. Therefore, further description of these features is omitted for the sake of brevity, except where necessary to understand the invention.

Figure 2:
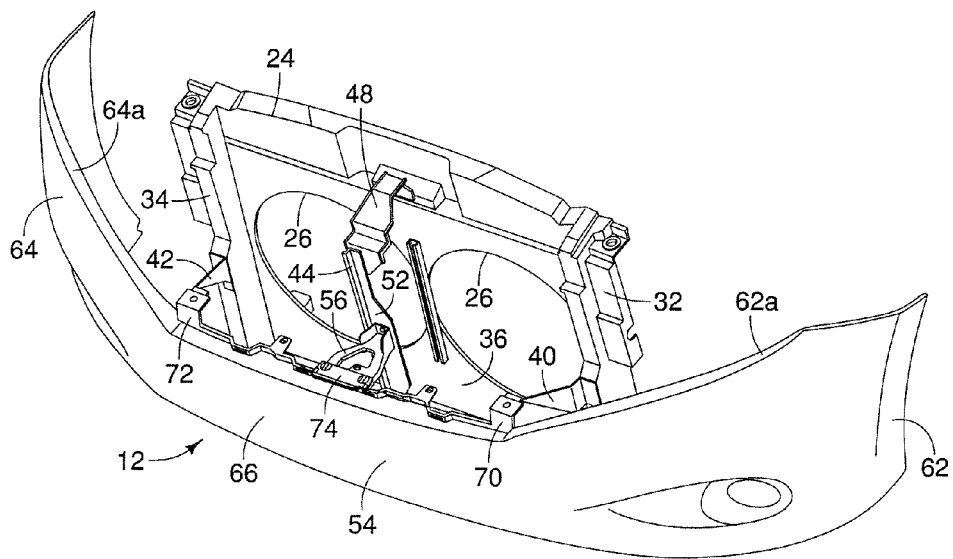
FIG. 2 is a perspective view of a portion of a vehicle body structure of the vehicle depicted in FIG. 1, showing a bumper fascia support assembly and a bracket of the bumper fascia support assembly in accordance with the one embodiment.
Figure 6:
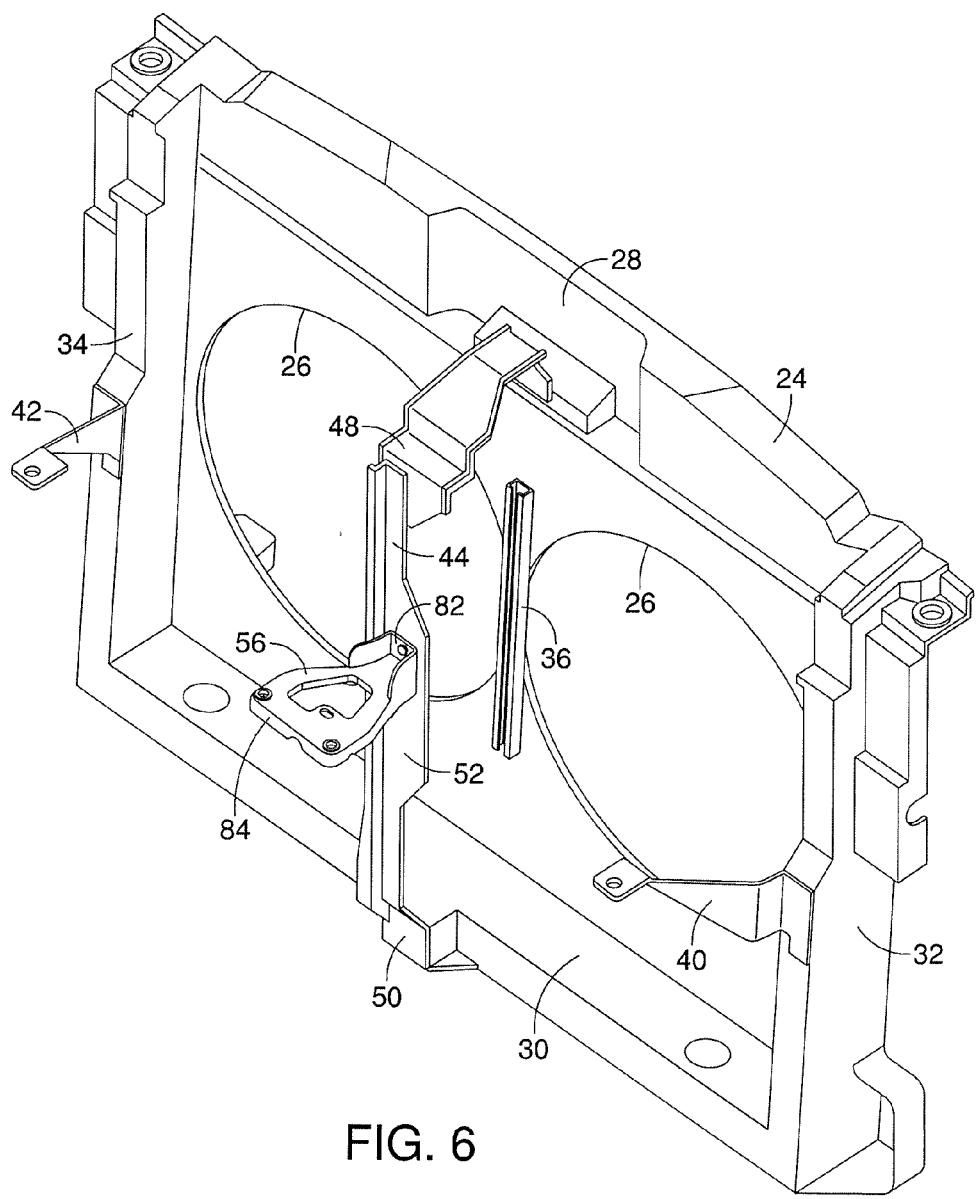
FIG. 6 is another perspective view of the portion of the vehicle body structure of the vehicle depicted in FIG. 1, showing another portion of the vehicle body structure and the bracket with the bumper fascia removed in accordance with the one embodiment.

The radiator fan supporting assembly 24 is part of the vehicle body structure 14 designed to support a radiator (not shown), cooling fans (not shown) and an air conditioning condenser (not shown) in a conventional manner. As shown in FIGS. 2 and 6, the radiator fan supporting assembly 24 is formed or constructed with fan openings 26, an upper rail 28, a lower rail 30, side rails 32 and 34, and a central section 36 between the fan openings 26. The radiator fan supporting assembly 24 also includes flanges and fastener portions located and dimensioned to support the radiator, cooling fans and an air conditioning condenser. The radiator fan supporting assembly 24 is rigidly attached to frame elements (not shown) of the vehicle body structure 14 in a conventional manner.

Figure 4:
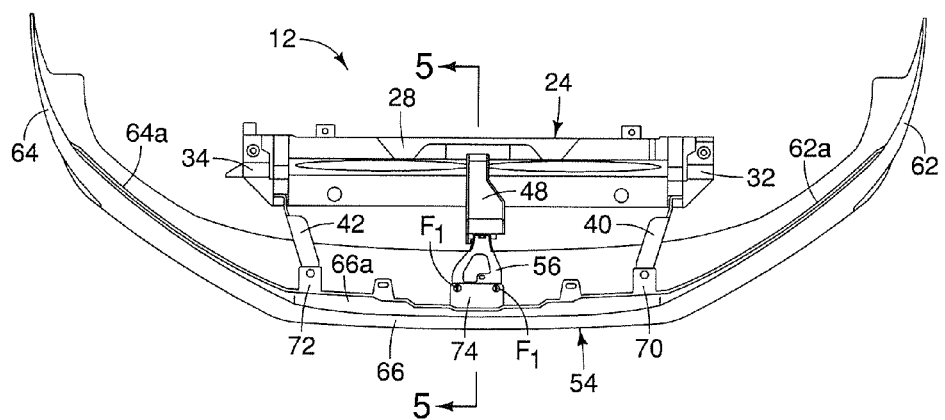
FIG. 4 is a top view of the vehicle body structure of the vehicle depicted in FIG. 1, showing the bumper fascia support assembly and the bracket of the bumper fascia support assembly in accordance with the one embodiment.

The radiator fan supporting assembly 24 also includes a first bracket 40, a second bracket 42 and a front support 44. The first bracket 40 and the second bracket 42 are fixedly attached to the radiator fan supporting assembly 24 by, for example, removable fasteners or welding techniques. As indicated in FIG. 4, the first bracket 40 extends forward from the side rail 32 in order to support a portion of the bumper fascia support assembly 12, as described in greater detail below. The second bracket 42 extends forward from the side rail 34 in order to also support a portion of the bumper fascia support assembly 12, as described in greater detail below. The first bracket 40 basically constitutes a first lateral attachment bracket and the second bracket 42 constitutes a second lateral attachment bracket.

The front support 44 is a vertically oriented bracket having a top end 48, a lower end 50 and a central section 52. The top end 48 is rigidly and fixedly attached to the upper rail 28 of the radiator fan supporting assembly 24 by fasteners and/or welding techniques. The lower end 50 is similarly rigidly and fixedly attached to the lower rail 30 of the radiator fan supporting assembly 24 by fasteners and/or welding techniques.

The front support 44 is configured to retain one or both of the condenser (not shown) and the coolant radiator (not shown). More specifically, one or both of the condenser and the coolant radiator can be installed in the space defined between the front support 44 and the remainder of the radiator fan supporting assembly 24.

Figure 5:
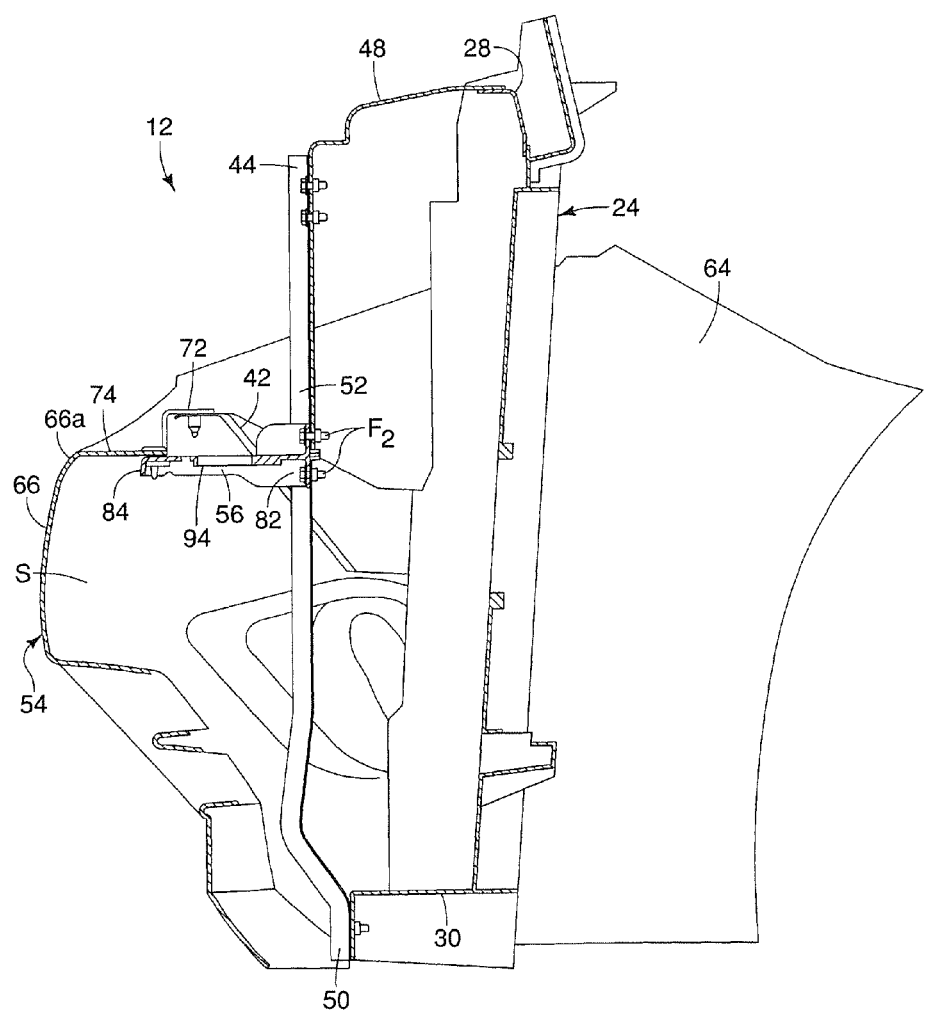
FIG. 5 is a cross-sectional view of the vehicle body structure of the vehicle taken along the line 5-5 in FIG. 4, showing the bumper fascia support assembly and the bracket of the bumper fascia support assembly in accordance with the one embodiment.

The bumper fascia support assembly 12 is now described with reference to FIGS. 2-5. The bumper fascia support assembly 12 basically includes the front support 44, a bumper fascia 54 and a bracket 56. It should be understood from the drawings and the description herein that the bumper fascia 54 is configured to cover and conceal a bumper assembly (not shown). As shown in FIG. 5, a space S is provided behind the bumper fascia 54 to receive the bumper assembly. However, except for the bumper fascia 54, the bumper assembly is omitted from the drawings to provide greater clarity. Since bumper assemblies are conventional vehicle features well known in the art, further description of bumper assemblies is omitted for the sake of brevity.

As shown in FIGS. 1-5, the bumper fascia 54 includes a first lateral end 62, a second lateral end 64 opposite the first lateral end 56 and a central section 66. Each of the first lateral end 62 and the second lateral end 64 include attachment projections (not shown) that, for example, attach the bumper fascia 54 to respective ones of the fenders 22 in a conventional manner. The first lateral end 62 and the second lateral end 64 have respective upper edges 62a and 64a that are located vertically above an upper edge 66a of the central section 66 of the bumper fascia 54 with the bumper fascia 54 installed to the vehicle body structure 14. Since the central section 66 has a lower vertical height that either of the first and second lateral ends 62 and 64, an open space is defined between the first lateral end 62 and the second lateral end 64 and above the upper edge 66a of the central section 66. Accordingly, the upper edge 66a of the central section 66 is shaped to receive a lower edge of a grille G. Hence the grille G (shown in FIG. 1) is located between the first lateral end 62 and the second lateral end 64, and above the central section 66 of the bumper fascia 54.

Figure 3:
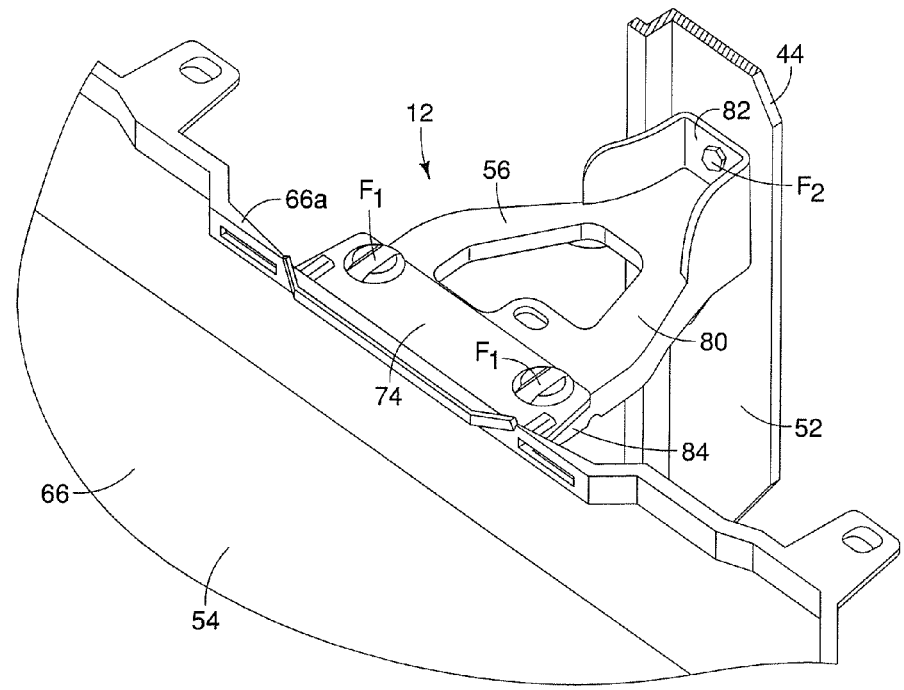
FIG. 3 is another perspective view of the portion of the vehicle body structure of the vehicle depicted in FIG. 1, showing the bumper fascia support assembly and the bracket of the bumper fascia support assembly in accordance with the one embodiment.

The central section 66 of the bumper fascia 54 includes a plurality of attachment projections 70, 72 and 74 positioned at the upper edge 66a thereof, as best shown in FIGS. 3 and 4.

The attachment projections 70, 72 and 74 extend rearward from the upper edge 66a of the central section 66 of the bumper fascia 54. The attachment projection 70 is attached to the first bracket 40 by, for example, a removable fastener. The attachment projection 72 is attached to the second bracket 42 by, for example, a removable fastener. The attachment projection 74 is attached to the bracket 56 by a pair of fasteners $F_1$, as is described in greater detail below after a description of the bracket 56. The above mentioned fasteners $F_1$ can be threaded fasteners or snap fitting fasteners.

Hence, the bumper fascia 54 is supported by the radiator fan supporting assembly 24 via the attachment brackets 40 and 42 and the bracket 56, which is described in greater detail below. The bracket 56 is located between and spaced apart from the first and second brackets 40 and 42.

Figure 7:
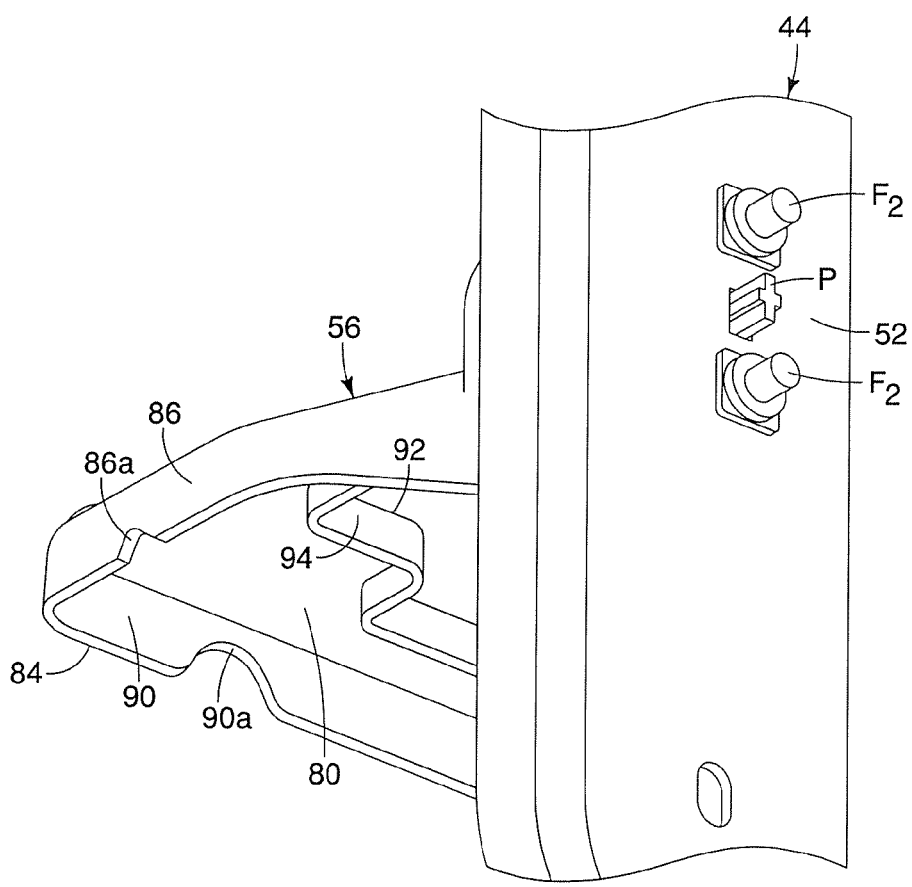
FIG. 7 is a perspective view of the vehicle body structure from a reverse angle, showing the bracket and its attachment to the vehicle body structure in accordance with the one embodiment.
Figure 8:
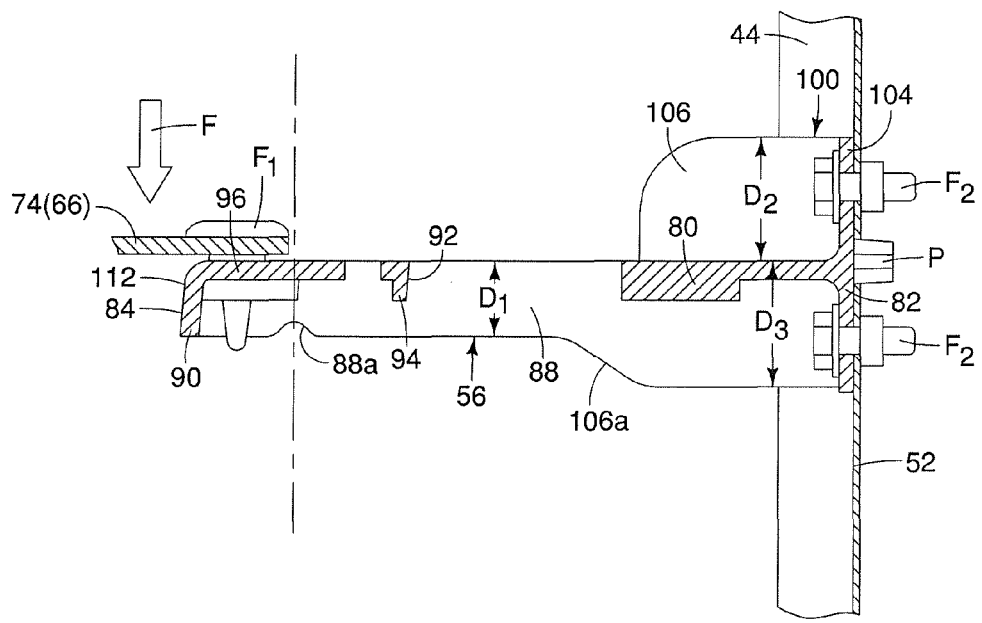
FIG. 8 is a cross-sectional view of a portion of the vehicle body structure and a portion of the bumper fascia showing the bracket in a non-impacted orientation in accordance with the one embodiment.
Figure 9:
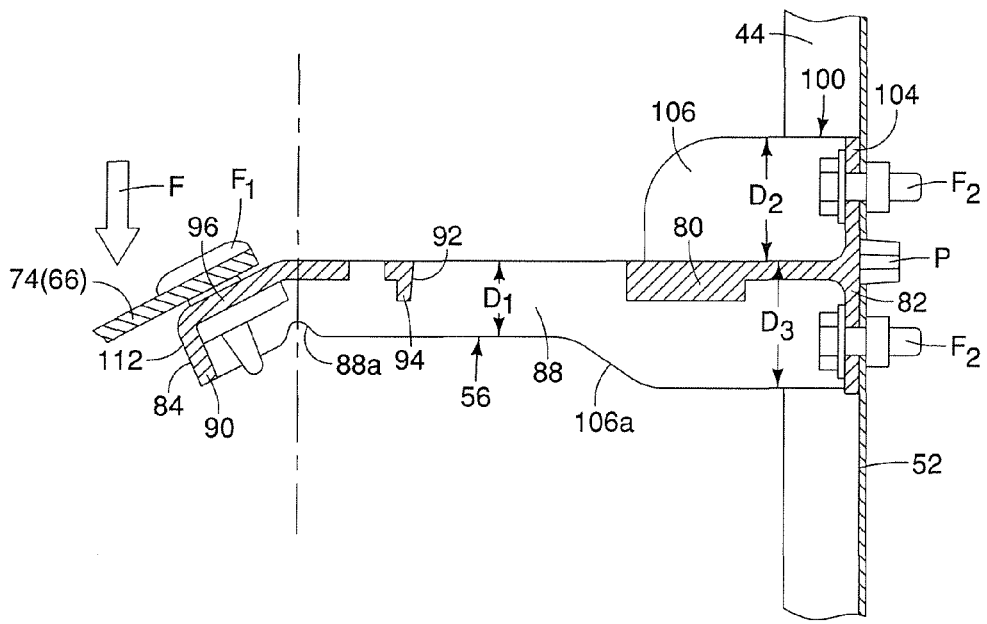
FIG. 9 is another cross-sectional view of the portion of the vehicle body structure and a portion of the bumper fascia depicted in FIG. 8, showing the bracket in an impacted orientation with a controlled deflection structure of the bracket bending downward in a predetermined manner in accordance with the one embodiment.

A description of the bracket 56 is now provided with specific reference to FIGS. 7-16. The bracket 56 basically includes a body section 80, a support attachment end 82 and a fascia attachment end 84. When installed within the vehicle 10 to the front support 44, the body section 80 extends horizontally between the support attachment end 82 and the fascia attachment end 84, as shown in FIG. 8. More specifically, as indicated in FIGS. 8 and 9, the support attachment end 82 of the bracket 56 is fixedly attached to the front support 44 by fasteners $F_2$ at a position that is below and spaced apart from the upper end 48, and a position that is above and spaced apart from the lower end 50 of the front support 44.

Figure 10:
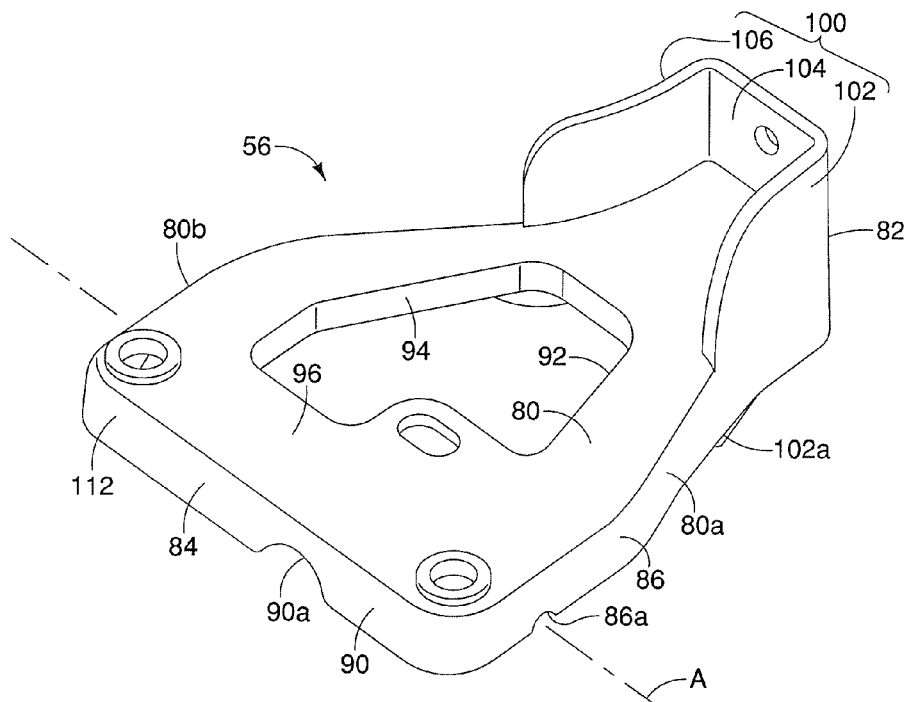
FIG. 10 is a perspective view of the bracket shown removed from the vehicle in accordance with the one embodiment.
Figure 11:
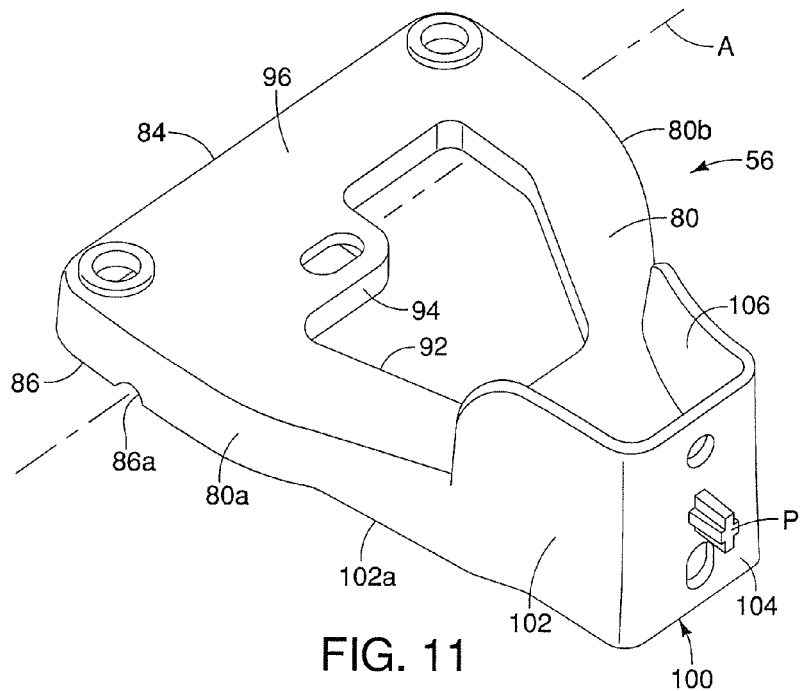
FIG. 11 is another perspective view of the bracket from a reverse angle showing the bracket removed from the vehicle in accordance with the one embodiment.
Figure 12:
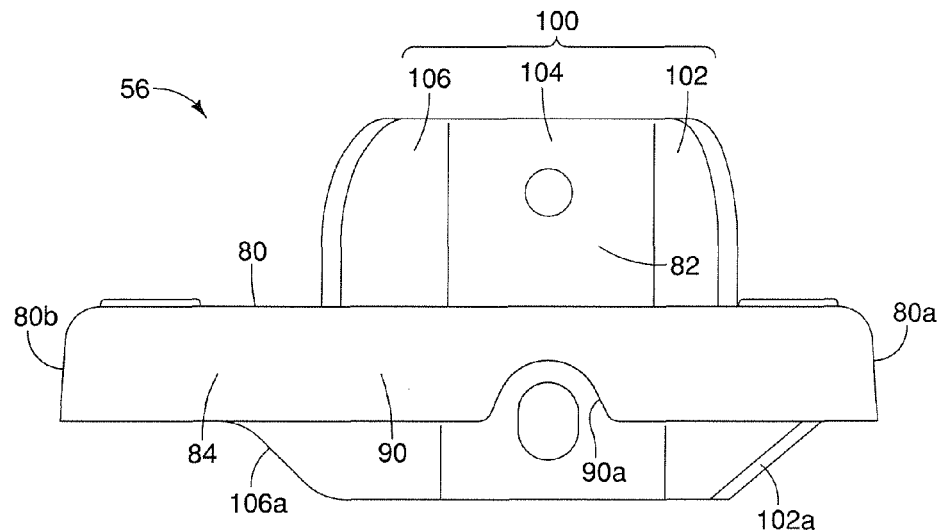
FIG. 12 is a front elevational view of the bracket shown removed from the vehicle in accordance with the one embodiment.
Figure 14:
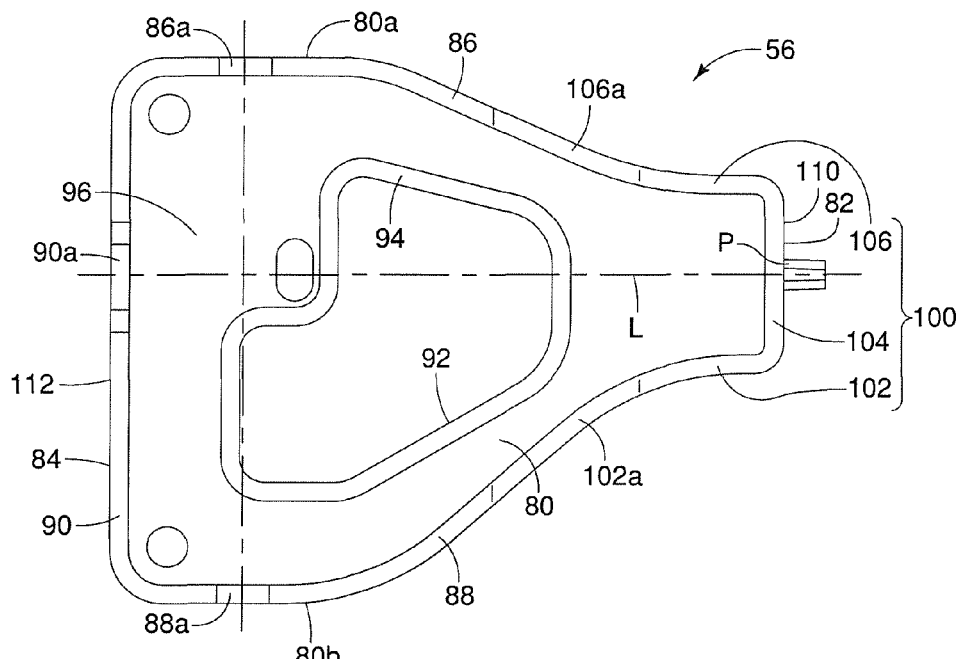
FIG. 14 is a bottom view of the bracket shown removed from the vehicle in accordance with the one embodiment.

The body section 80 includes a first reinforcing web 86, a second reinforcing web 88 and a third reinforcing web 90. As shown in FIGS. 10, 11, 14 and 15, the first reinforcing web 86 extends along and at least partially defines a first lateral side 80a of the body section 80 in a longitudinal vehicle direction of the vehicle 10. As shown in FIGS. 14 and 16, the second reinforcing web 88 extends along and at least partially defines a second lateral side 80b of the body section 80 in a longitudinal vehicle direction of the vehicle 10. As shown in FIGS. 10, 12 and 14, the third reinforcing web 90 extends along the fascia attachment end 84 of the bracket 56.

The first, second and third reinforcing webs 86, 88 and 90 define a single, uninterrupted web extending around three sides of the body section 80 that reinforces the strength of the body section 80 during head-on impacting events (with a horizontally directed impacting force component). As shown in FIGS. 10, 11 and 14-16, each of the first and second reinforcing webs 86 and 88 includes corresponding weakened sections 86a and 88a. The weakened sections 86a and 88a along with a forward portion 96 of the body section 80 define a controlled deflection structure. As indicated in FIG. 9, the controlled deflection structure is configured with respect to the support attachment end 82 and the fascia attachment 84 to deform downwardly in response to a prescribed impacting force being applied horizontally to the bumper fascia 54 so that the fascia attachment end 84 and the central section 66 of the bumper fascia 54 move downward relative to the support attachment end 82, thereby absorbing impact energy. The controlled deflection structure, including the weakened sections 86a and 88a, also provide energy absorption during impact events where there is a downward component to the impacting force, such as the force F indicated in FIG. 9. The third reinforcing web 90 includes a recess 90a. However, the recess 90a is defined in the third reinforcing web 90 to provide tool access during installation of the bracket 56.

The recesses 86a and 88a (part of the controlled deflection structure) are formed along a region of the body section 80 adjacent to but spaced apart from the fascia attachment end 84, as shown in FIGS. 7-11.

Figure 13:
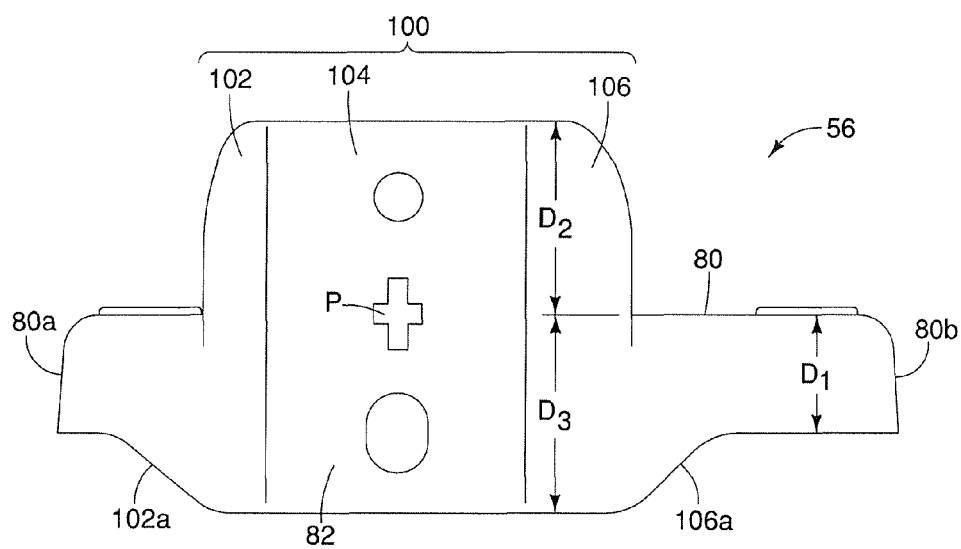
FIG. 13 is a rear elevational view of the bracket shown removed from the vehicle in accordance with the one embodiment.

The body section 80 also includes a central opening 92 that is surrounded by an inner webbing 94. The forward portion 96 of the body section 80 is located between the central opening 92 and the fascia attachment end 84, further defining the controlled deflection structure. As indicated in FIG. 13, the reinforcing webs 86, 88 and 90 extend downward a first distance $D_1$ from an upper surface of the body section 80 thereby surrounding at least a portion of an outer periphery of the body section 80. Hence, the reinforcing webs 86, 88 and 90 extend continuously along the first lateral side 80a, the fascia attachment end 84 and the second lateral side 80b of the main body 80.

Figure 15:
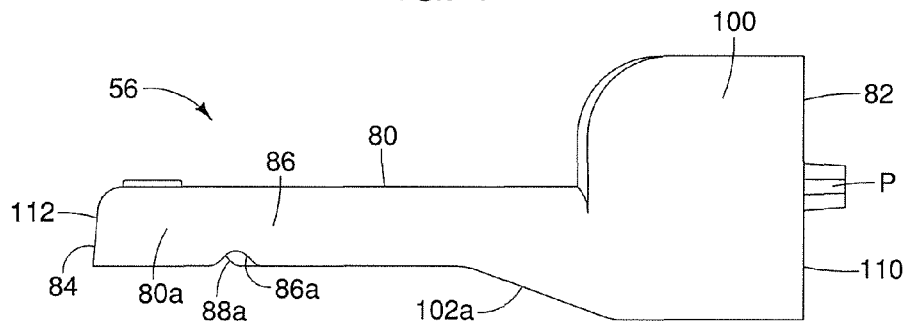
FIG. 15 is a first side elevational view of the bracket shown removed from the vehicle in accordance with the one embodiment.
Figure 16:
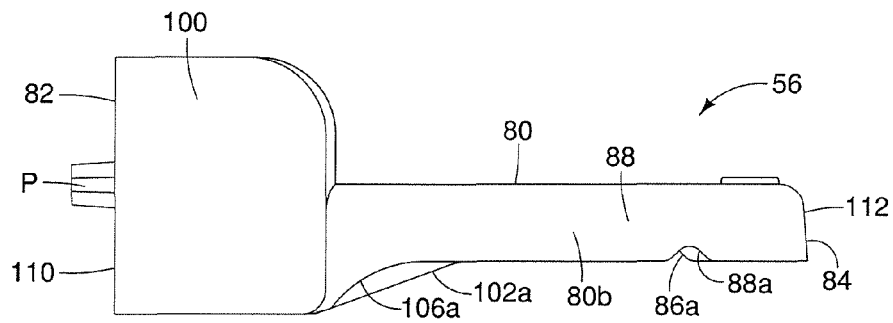
FIG. 16 is a second side view of the bracket shown removed from the vehicle in accordance with the one embodiment.

As shown in FIG. 15, the weakened section 86a of the reinforcing web 86 is basically a first notch formed along the first lateral side 80a of the body section 80. As shown in FIG. 16, the weakened section 88a of the reinforcing web 88 is basically a second notch formed along the second lateral side 80b of the body section 80. As best shown in FIGS. 10, 11 and 14, a bending axis A is defined between the weakened section 86a and the weakened section 88a. It should be understood from the drawings that the weakened section 86a and the weakened section 88a can be defined by something other than notches or recesses. For example, the weakened section 86a and the weakened section 88a can be defined by sections of the reinforcing webs 86 and 88 having reduced thicknesses.

As shown in FIGS. 4 and 10-16, the support attachment end 82 of the bracket 56 includes a vertically extending flange 100 that extends perpendicularly to the body section 80. As shown in FIG. 14, a line L of the body section 80 extends in a vehicle longitudinal direction through a center of the support attachment end 82, forward and through the fascia attachment end 84 of the bracket 56. The line L is centered with respect to the support attachment end 82, but is slightly off center with respect to the body section 80 and the fascia attachment end 84. As shown in FIG. 4, the fasteners $F_1$ attach the fascia attachment end 84 of the bracket 56 to the bumper fascia 54 at first and second locations that are spaced apart from one another in a vehicle lateral direction such that the line L extends between the first and second locations of the fasteners $F_1$. The flange 100 includes a first flange portion 102, a second flange portion 104 and a third flange portion 106. The second flange portion 104 extends between the first and third flange portions 102 and 106. The first flange portion 102 faces the third flange portion 106 such that the first, second and third flange portions 102, 104 and 106 define a U-shape when viewed from above or below, as in FIG. 14. An upper portion of the flange 100 extends upward from the upper surface of the body section 80 by a distance $D_2$. The flange 100 also includes a lower portion that extends downward from the upper surface of the main body 80 by a distance $D_3$. As indicated in FIG. 13, the distance $D_3$ is greater than the distance $D_2$.

As indicated in FIG. 14, the support attachment end 82 has a width that is less than the width of the fascia attachment end 84. The support attachment end 82 includes a projection P that is used to align the support attachment end 82 with the central section 52 of the front support 44 during installation. Specifically, the projection P is inserted into an aperture formed in the central section 52, making it easier to then install fasteners through correspondingly aligned apertures of the support attachment end 82 and the central section 52 of the front support 44, as shown in FIGS. 7-9. As is shown in FIG. 7, the support attachment end 82 of the bracket 56 attaches via fasteners $F_2$ to the front support 44 at a first location above the body section 80 and a second location below the body section 80. The locations of the fasteners $F_2$ relative to the fascia attachment end 84 define a triangle that extends along a vertically oriented plane. The locations of the fasteners $F_2$ are also aligned with the line L. This geometry provides vertical stability to the bracket 56 relative to the front support 44. Further, as indicated in FIG. 3, the locations of the fasteners $F_1$ relative to a rear end of the body section 80 of the bracket 56 defines a triangle that extends along a horizontally oriented plane. This geometry provides horizontal stability to the bracket 56 relative to the front support 44 and the bumper fascia 54.

The flange 100 of the support attachment end 82 of the bracket 56 defines a rearward-most end surface 110 of the bracket 56. The fascia attachment end 84 defines a forward-most end surface 112 of the bracket 56. The rearward-most end surface 110 and the forward-most end surface 112 extend in directions that are parallel to one another.

The first flange portion 102, the second flange portion 104 and the third flange portion 106 are angularly offset from one another. Specifically, the first flange portion 102 extends along a rearward portion of the first lateral side 80a, the second flange portion 104 extends along the support attachment end 82 and the third flange portion 106 extends along a rearward portion of the second lateral side 80b. At the intersection of the first flange portion 102 and the second flange portion 104, the first flange portion 102 and the second flange portion 104 are initially perpendicular to one another. However, the first flange portion 102 has an arcuate contour, as indicated in FIG. 14. Therefore, a majority of the first flange portion 102 flares away from the second flange portion 104. Similarly, at the intersection of the third flange portion 106 and the second flange portion 104, the third flange portion 106 and the second flange portion 104 are initially perpendicular to one another. However, the third flange portion 106 has an arcuate contour, as indicated in FIG. 14. Therefore, a majority of the third flange portion 106 flares away from the second flange portion 104.

Hence, the arcuate contours (flaring) of each of the first and third flange portions 102 and 106, and the overall height ($D_2$ plus $D_3$) of the flange 100, provide the flange 100 with rigidity and overall strength. Specifically, the attachment of the bracket 56 to the central section 52 of the front support 44 provides a large resistance to fracturing and/or bending that might result from force being applied to the bracket 54.

The first and third flange portions 102 and 106 are further continuous with respective ones of the first and second reinforcing webs 86 and 88. In other words, the first flange portion 102 and the first reinforcing web 86 are formed integrally in an uninterrupted manner. Rather, a lower edge of the first flange portion 102 includes a tapered flange 102a, that smoothly transitions to the first reinforcing web 86, as indicated in FIG. 15. Similarly, the second flange portion 106 and the second reinforcing web 88 are formed integrally in an uninterrupted manner. A lower edge of the third flange portion 106 includes a tapered flange 106a, that smoothly transitions to the second reinforcing web 88, as indicated in FIG. 16. The smooth transition between the first and third flange portions 102 and 106 and the first and second reinforcing webs 86 and 88 further increases amount of force required to bend or fracture the bracket 56 at the support attachment end 82 of the bracket 56.

As shown in FIGS. 2-5 and 8-9, the projection 74 of the central section 66 of the bumper fascia 54 is fixedly attached to the fascia attachment end 84 of the bracket 56. The support attachment end 82 is reinforced by the flange 100, as described above. The first and second lateral sides 80a and 80b are reinforced by the first and second reinforcing webs 86 and 88, respectively. However, the first and second lateral sides 80a and 80b of the bracket 56 are weakened by the weakened sections 86*a* and 88*a*. Consequently, the weakened sections 86*a* and 88*a* and the forward portion 96 together define a controlled deflection structure. Hence, when the bumper fascia 54 is impacted by a head-on impact with a predetermined level of force, the bumper fascia 54 transfers a portion of that force as the force F (FIG. 9) causing the controlled deflection structure (the weakened sections 86*a* and 88*a* and the forward portion 96) to direct bending and/or fracturing of the bracket 56 along the bending axis A, as indicated in FIG. 9.

Hence, the bracket 56 includes the controlled deflection structure (the weakened sections 86*a* and 88*a* and the forward portion 96), that responds to impact events by bending downward in a predetermined manner as depicted in FIG. 9, where the impact events include a head-on impacting force applied to a bumper fascia 56. Further, since the support attachment end 82 is reinforced to resist bending and fracture due to the inclusion of the flange 100, the support attachment end 82 is able to withstand forces acting upon it that have a significantly greater level of force as compared to the downward component force F that can cause the controlled deflection structure to bend.

The various elements of the vehicle body structure 14 and the vehicle 10 in general, are conventional components that are well known in the art. Since these vehicle related features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the bumper fascia support assembly. Accordingly, these terms, as utilized to describe the present invention should be interpreted relative to a vehicle equipped with the bumper fascia support assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A bumper fascia support assembly comprising:
    a front support;
    a bracket having a support attachment end, a body section and a fascia attachment end, the support attachment end being fixedly attached to a forward facing surface of the front support; and
    a bumper fascia having a central section fixedly attached to the fascia attachment end of the bracket, the body section of the bracket having a controlled deflection structure being configured with respect to the support attachment end and the fascia attachment end to deform downwardly in response to a prescribed impacting force being applied to the bumper fascia so that the fascia attachment end and the central section of the bumper fascia move downward relative to the support attachment end absorbing impact energy.

2. The bumper fascia support assembly according to claim 1, wherein
    the body section extends horizontally between the support attachment end and the fascia attachment end with the bracket installed to the front support.

3. The bumper fascia support assembly according to claim 1, wherein
    the controlled deflection structure is formed along a region of the body section closer to the fascia attachment end than to the support attachment end.

4. The bumper fascia support assembly according to claim 1, wherein
    the body section includes a first reinforcing web and a second reinforcing web that extend along opposing lateral sides of the body section in a longitudinal vehicle direction, each of the first and second reinforcing webs defining a weakened section that defines at least a portion of the controlled deflection structure.

5. The bumper fascia support assembly according to claim 1, wherein
    the support attachment end includes a vertically extending flange that extends perpendicularly to the body section.

6. The bumper fascia support assembly according to claim 5, wherein
    the flange includes first, second and third flange portions, the second flange portion extending between the first and third flange portions, the first flange portion facing the third flange portion such that the first, second and third flange portions define a U-shape when viewed from above.

7. The bumper fascia support assembly according to claim 5, wherein
    the flange includes an upper portion that extends upward from a top surface of the main body and the flange includes a lower portion that extends downward from the top surface of the main body.

8. The bumper fascia support assembly according to claim 5, wherein the body section includes a reinforcing web that extends downward a first distance from the main body surrounding at least a portion of an outer periphery of the main body, and the flange includes a lower portion extending downward from the main body by a second distance greater than the first distance, the lower portion of the flange having a stiffening section that extends from a lower edge of the lower portion of the flange to the web of the main body.

9. The bumper fascia support assembly according to claim 1, wherein the body section includes a first lateral side, a second lateral side and a reinforcing web extending downward from the main body continuously along the first lateral side, the fascia attachment end and the second lateral side of the main body.

10. The bumper fascia support assembly according to claim 9, wherein the reinforcing web has a first notch formed along the first lateral side and a second notch formed along the second lateral side, the first and second notches at least partially defining the body section.

11. The bumper fascia support assembly according to claim 1, wherein the support attachment end defines a rearward-most end surface of the bracket, the fascia attachment end defines a forward-most end surface of the bracket, and the rearward-most end surface of the bracket and the forward-most end surface of the bracket extend in directions that are parallel to one another.

12. The bumper fascia support assembly according to claim 1, wherein the body section of the bracket includes a first lateral side and a second lateral side with the fascia attachment end extending therebetween, and a downwardly extending reinforcing web that wraps around the first lateral side, the fascia attachment end and the second lateral side of the main body, the web having a first notch formed along the first lateral side and a second notch formed along the second lateral side, the first and second notches at least partially defining the body section.

13. The bumper fascia support assembly according to claim 1, wherein the front support is vertically oriented relative to the bumper fascia.

14. The bumper fascia support assembly according to claim 1, further comprising a radiator fan supporting assembly, with a top end of the front support being fixedly attached to an upper end of the front fan supporting assembly and a lower end of the front support being fixedly attached to a lower portion of the front fan supporting assembly.

15. The bumper fascia support assembly according to claim 14, wherein the support attachment end of the bracket is fixedly attached to the front support at a position that is below and spaced apart from the upper end, and above and spaced apart from the lower end of the front support.

16. The bumper fascia support assembly according to claim 14, wherein the bumper fascia is supported by the radiator fan supporting assembly via first and second lateral attachment brackets, the first lateral attachment bracket being fixed at one end to a first lateral side of the radiator fan supporting assembly and the second lateral attachment bracket being fixed at one end to a second lateral side of the radiator fan supporting assembly, with the bracket being located between and spaced apart from the first and second lateral attachment brackets.

17. The bumper fascia support assembly according to claim 1, wherein the bumper fascia has a first lateral end and a second lateral end having respective upper edges located vertically above an upper edge of the central section of the bumper fascia.

18. The bumper fascia support assembly according to claim 17, wherein the bumper fascia is shaped to receive a grille in a space between the first side and the second side and above the central section of the bumper fascia.

19. The bumper fascia support assembly according to claim 1, wherein the support attachment end of the bracket attaches to the front support at a first location above the body section and a second location below the body section.

20. The bumper fascia support assembly according to claim 1, wherein the fascia attachment end of the bracket attaches to the bumper fascia at first and second locations that are spaced apart from one another in a vehicle lateral direction with a line of the body section being located between the first and second locations, the line of the body section extending in a vehicle longitudinal direction and through a center of the support attachment end.

* * * * *